United States Patent [19]

Pejryd et al.

[11] Patent Number: 5,607,887
[45] Date of Patent: Mar. 4, 1997

[54] METHOD FOR PREPARING CERAMIC MIXED-OXIDE MATERIALS, PARTICULARLY INTENDED TO BE USED AS MATRIX MATERIAL IN COMPOSITE CERAMIC PRODUCTS

[75] Inventors: Lars Pejryd; Robert Lundberg, both of Trollhättan; Jesper Brandt, Göteborg, all of Sweden

[73] Assignee: Volvo Aero Aktiebolag, Trollhattan, Sweden

[21] Appl. No.: 367,265

[22] PCT Filed: Jul. 7, 1993

[86] PCT No.: PCT/SE93/00618

§ 371 Date: Feb. 15, 1995

§ 102(e) Date: Feb. 15, 1995

[87] PCT Pub. No.: WO94/02431

PCT Pub. Date: Feb. 3, 1994

[30] Foreign Application Priority Data

Jul. 15, 1992 [SE] Sweden .................................. 9202174

[51] Int. Cl.[6] ............................................ C04B 35/01
[52] U.S. Cl. ............................ 501/94; 501/102; 501/105; 501/108; 501/126; 501/127; 501/128; 501/133; 501/134; 501/152; 501/153; 501/154; 75/252; 75/254
[58] Field of Search .................................. 501/126, 94, 96, 501/102, 105, 108, 152, 127, 128, 133, 134, 153, 154; 75/252, 230, 254

[56] References Cited

U.S. PATENT DOCUMENTS

| | | | |
|---|---|---|---|
| 4,217,113 | 8/1980 | Suh et al. | 501/102 |
| 4,557,884 | 12/1985 | Petrak et al. | 501/96 |
| 4,605,634 | 8/1986 | DeAngelis | 501/96 |
| 5,338,712 | 8/1994 | MacMillan et al. | 501/94 |

FOREIGN PATENT DOCUMENTS

| | | |
|---|---|---|
| 2209345 | 5/1989 | United Kingdom . |
| 89/09755 | 10/1989 | WIPO . |

*Primary Examiner*—Mark L. Bell
*Assistant Examiner*—Michael Marcheschi
*Attorney, Agent, or Firm*—Pollock, Vande Sande & Priddy

[57] ABSTRACT

The present invention provides a method for preparing a ceramic mixed-oxide of at least two metals including mixing an alloy with a ceramic oxide. The alloy including a metal selected from the group consisting of aluminum, calcium, lithium, magnesium, silicon, titanium, yttrium, and zirconium. The alloy also includes an element that is to be present in the ceramic mixed-oxide. The element is different from the metal and is selected from the group consisting of aluminum, calcium, lithium, magnesium, a combination of magnesium and silicon, silicon, titanium, yttrium, and zirconium. The ceramic oxide includes a metal that is to be present in the ceramic mixed oxide. The alloy and ceramic oxide are co-milled. The mixed and co-milled alloy and ceramic oxide are reaction-sintered, thereby oxidizing the metal and element of the alloy to produce the ceramic mixed-oxide.

18 Claims, No Drawings

METHOD FOR PREPARING CERAMIC MIXED-OXIDE MATERIALS, PARTICULARLY INTENDED TO BE USED AS MATRIX MATERIAL IN COMPOSITE CERAMIC PRODUCTS

This application is a 371 of PCT/SE93/00618, filed Jul. 7, 1993.

FIELD OF INVENTION

The present invention refers to a method for preparing ceramic mixed-oxide materials, particularly intended to be used as matrix material in composite ceramic products, by mixing and co-milling of a metal and a ceramic oxide material and subsequent reaction-sintering in an oxidizing atmosphere.

BACKGROUND OF THE INVENTION

In the preparation of ceramic oxide materials of the kind referred to by mixing and co-milling of a metal and a ceramic oxide material and subsequent reaction-sintering, it has always keen desirable to use the metal in a particulate form with the smallest possible particle size Therefore, in many cases it has been attempted to use milled aluminum having a flake shape. A disadvantage of these processes has been, however, that the flakes smear and adhere to the millingbodies due to the softness of the metal and, hence, also mostly remain in a flake shape. See e.g., Nils Claussen et al. "Low-shrinkage Reaction-Bonded Alumina", J. Europ. Caram. Soc., 5, 1989, pages 29–35. See also other articles of and with Nils Claussen and his research group, such as "Tailoring of Reaction-Bonded $Al_2O_3$ Ceramics" Corem Eng Sci Proc, 11, pages 806–820, 1990.

Another way to achieve a better homogeneity between metal and oxide materials in the present connection has been suggested for example, by the US firm Lanxide Corp., Newark, Del., USA and implies that an oxidation of the metal is carried out in melted form. See "Formation of Lanxide ceramic composite materials", J. Mater Res, 1, 1986, pages 81–89. Furthermore, Swedish patent No. 8103269-0 discloses a method of preparing shapes of silicon nitride based materials.

SUMMARY OF THE INVENTION

Since the fine-division of the metal that, in which in most cases, constitutes the step that is difficult to surmount for achieving the goals aimed at, the present invention now suggests a different way of overcoming the difficulties. The feature essentially distinguishing the present invention is that the metal is used in the form of an alloy with an element that is to be present in the final oxide material. In this connection, it is a particular advantage of the invention that the element that the metal is to be alloyed with, is selected such that the alloy obtained becomes brittle so as to facilitate the milling. The subsequent reaction-sintering furthermore can be improved by adding a catalyst metal to the alloy.

DETAILED DESCRIPTION OF THE INVENTION

Thus, the basic idea of the present invention is to mill, together with a suitable oxide compound, a brittle metal alloy into fine particle sizes. In the subsequent reaction-sintering, the metal is oxidized to its corresponding ceramic composition.

Examples of materials that may be employed in the method of the present invention are illustrated by referring to a test with an Al:Si-alloy (88:12) that, together with $Al_2O_3$ was successfully milled to fine-size particles. Dry-pressed bodies of this composition were oxidized. It turned out that all of the Si, together with a portion of Al, formed mullite. Furthermore, this occurs already at a temperature below 1400° C. in air atmosphere.

Other ceramic materials that can be manufactured according to the same principles are $Al_2TiO_5$, $3Y_2O_3.5Al_2O_3$ (YAG), $Mg_2Al_4Si_5O_{18}$ (coerdirite), $MgAl_2O_4$ (spinel), $LiAlSi_2O_6$ (β-spodumene) and $CaZrO_3$ ($T_m$>2300° C.).

By the invention, it might be achieved that the milling of a pulverulent metal alloy with predetermined brittleness provides particles of sub-micron size (<1 μm). This provides for a really homogenous distribution of the metals in the alloy and, hence, reduces the temperature of the transformation to the corresponding ceramic composition. The homogenous distribution furthermore promotes this transformation. Moreover, when preparing an alloy powder having an added catalyst metal the reactivity might be further increased, for example, by adding Mg to Al:Si. It also becomes possible to select the alloy such that an exactly correct ceramic composition is obtained. Owing to the correct ceramic composition the shrinkage during the oxidization also might be controlled and minimized. Should the metal be made still more brittle so as to promote the milling thereof, a gas-atomized alloy powder may be produced having a certain quantity of added ceramic powder.

EXAMPLE 1

Preparation of mullite

Two powder mixtures were prepared. One of them (reference AlSi) consisted of 30% by weight of Al:Si-alloy, weight ratio 88:12, (Johnson Matthey, <44 μm), 69% by weight of $Al_2O_3$ (Alcoa, Al52SG, BET=3,2 $m^2$/g) and 1% by weight of Mg (Merck, <1 mm), as an auxiliary oxidization agent. The other (reference AlSi—$ZrO_2$) consisted of 30% by weight of Al:Si, 49% by weight of $Al_2O_3$, 20% by weight of $ZrO_2$ and 1% by weight of Mg. $ZrO_2$ was added as oxygen-diffusion-increasing agent. The two mixtures were milled in a ball mill with $Si_3N_4$-balls in an organic solvent to which was added dispersing and pressing agents. After milling, the specific surface (BET) of AlSi had increased from 5,9 $m^2$/g to 10,0 $m^2$/g and for AlSi—$ZrO_2$ from 6,5 $m^2$/g to 10.5 $m^2$/g. Studies in a scanning-electron microscope disclose that the alloys were milled into sub-micron particles. The organic solvent was removed in a thin-film evaporator. After that, the mixtures were screen-granulated. The powder mixtures were subjected to cold isostatic pressing at 300 MPa to form green bodies with green densities Of 71% of the theoretic density.

Oxidation tests were carried out in a thermo-gravimetric analyzing equipment (TGA). At 1400° C. all Si with a portion of Al had been oxidized to mullire ($Al_6Si_2O_{13}$), as proved by X-ray analyses. The density of the samples amounted to 84% of the theoretic value (valid for both AlSi and AlSi—$ZrO_2$). In AlSi—$ZrO_2$-samples, $ZrO_2$ reacted with Si and was oxidized to $ZrSiO_4$ in a temperature range between 1100° and 1300° C., after which $ZrSiO_4$ reacted with $Al_2O_3$ so as to form mullite at 1400° C. The results also showed that in tests with $ZrO_2$-addition the oxidation rate of the alloy increased deeper in the inner of the body.

EXAMPLE 2

$Y_2Al$ (Alfa Products) was melted and spray-atomized. The powder obtained was weighed together with $Al_2O_3$ (Alcoa, Al65G) in required quantities. The mixture was milled in a mill grinder with $Al_2O_3$-balls in an organic solvent with added dispersing and pressing agent. Studies in scanning-electron microscope showed that the alloy had been milled to sub-micron particles. The organic solvent was removed by means of a thin-film evaporator. After that, the mixture was screen-granulated. The powder mixture was subjected to cold isostatic pressing at 300 MPa to form test bodies.

Oxidation tests were made in a thermo-gravimetric analyzing equipment (TGA) at 400°–1700° C. The resulting material consisted of yttrium-aluminium garnet (YAG), which was identified by means of X-ray diffraction.

EXAMPLE 3

$Ti_2Al$-powder (Alfa Products) was weighed together with $Al_2O_3$ (Alcoa, Al65G) in required quantities. The mixture was milled in a ball mill with $Al_2O_3$-balls in an organic solvent with added dispersing and pressing agents. Studies in scanning-electron microscope disclosed that the alloy had been milled to sub-micron particles. The organic solvent was removed by means of a thin-film evaporator and after that the mixture was screen-granulated. The powder mixture was subjected to cold isostatic pressing at 300 MPa to form green bodies.

Oxidation tests were carried out in a thermo-gravimetric analyzing equipment (TGA) at 1400°–1500° C. The resulting material consisted of aluminum titanate ($Al_2TiO_5$), which was identified by means of X-ray diffraction.

We claim:

1. A method for preparing a ceramic mixed-oxide of at least two metals, said method comprising the steps of:

mixing an alloy including a metal selected from the group consisting of aluminum, calcium, lithium, magnesium, titanium, and yttrium, said alloy also including an element that is to be present in said ceramic mixed-oxide, said element being different from said metal and is selected from the group consisting of aluminum, silicon, and titanium, with a ceramic oxide that includes a metal that is to be present in said ceramic mixed oxide;

co-milling said alloy and ceramic oxide; and reaction-sintering said mixed and co-milled alloy and ceramic oxide, thereby oxidizing said metal and element of said alloy to produce said ceramic mixed-oxide.

2. A method according to claim 4, wherein said ceramic mixed oxide is selected from the group consisting of mullite, yttrium aluminum garnet, aluminum titanate, spinel, coerdirite, and β-spodumene.

3. A method according to claim 1, wherein said metal in said ceramic oxide is selected from the group consisting of aluminum, silicon, and zirconium.

4. A method according to claim 1, wherein said element is selected such that the alloy is brittle, thereby facilitating said co-milling.

5. A method according to claim 1, further comprising the step of:

adding a catalyst metal to said alloy.

6. A method according to claim 5, wherein said catalyst metal is magnesium.

7. A method according to claim 2, further comprising the step of:

adding a catalyst metal to said alloy.

8. A method according to claim 7, wherein said catalyst metal is magnesium.

9. A method according to claim 3, further comprising the step of:

adding a catalyst metal to said alloy.

10. A method according to claim 9, wherein said catalyst metal is magnesium.

11. A method according to claim 1, wherein a starting composition ratio of said metal and element in said alloy is selected to match exactly a final composition ratio of said metal and element in said ceramic mixed oxide.

12. A method according to claim 2, wherein a starting composition ratio of said metal and element in said alloy is selected to match exactly a final composition ratio of said metal and element in said ceramic mixed oxide.

13. A method according to claim 3, wherein a starting composition ratio of said metal and element in said alloy is selected to match exactly a final composition ratio of said metal and element in said ceramic mixed oxide.

14. A method according to claim 1, wherein said alloy is selected from the group consisting of alloys of aluminum and silicon, yttrium and aluminum, and titanium and aluminum.

15. A method according to claim 14, wherein said aluminum and silicon are present in said alloy in a ratio of 88 percent aluminum to 12 percent silicon.

16. A method according to claim 1, wherein said ceramic oxide is selected from the group consisting of $Al_2O_3$ and $ZrO_2$.

17. A method according to claim 1, wherein said ceramic mixed oxide is selected from the group consisting of $Al_2TiO_5$, $3Y_2O_3 \cdot 5Al_2O_3$, $MgAl_2O_4$, $Mg_2Al_4Si_5O_{18}$, $LiAlSi_2O_6$, and $CaZrO_3$.

18. A method according to claim 1, wherein said alloy and ceramic oxide are milled to particles of submicron size.

* * * * *